United States Patent
Leist et al.

(10) Patent No.: US 6,571,637 B2
(45) Date of Patent: Jun. 3, 2003

(54) FLEXURE ASSEMBLY

(75) Inventors: Theodore Leist, Middletown, OH (US); Edward L. Peterson, Hudson, OH (US); William M. Rusen, Fairlawn, OH (US); Richard E. McCormick, Bay Village, OH (US)

(73) Assignee: MB Dynamics, Cleveland, OH (US)

( * ) Notice: Subject to any disclaimer, the term of this patent is extended or adjusted under 35 U.S.C. 154(b) by 0 days.

(21) Appl. No.: 10/145,401

(22) Filed: May 14, 2002

(65) Prior Publication Data
US 2002/0184952 A1 Dec. 12, 2002

Related U.S. Application Data

(60) Division of application No. 09/690,607, filed on Oct. 17, 2000, now Pat. No. 6,389,900, which is a continuation-in-part of application No. 09/377,122, filed on Aug. 19, 1999, now Pat. No. 6,131,461.
(60) Provisional application No. 60/098,746, filed on Sep. 1, 1998.

(51) Int. Cl.$^7$ ................................................. G01M 7/00
(52) U.S. Cl. ....................................................... 73/662
(58) Field of Search .......................... 73/662, 663, 669

(56) References Cited

U.S. PATENT DOCUMENTS

| | | | |
|---|---|---|---|
| 3,106,653 A | 10/1963 | Fowler |
| 3,123,728 A | 3/1964 | Kreiskorte |
| 3,167,670 A | 1/1965 | Spurlin |
| 3,326,038 A | 6/1967 | Schloss |
| 4,499,772 A | 2/1985 | Haas |
| 4,715,229 A | 12/1987 | Butts |
| 4,858,488 A | 8/1989 | Butts |
| 4,977,342 A | 12/1990 | Adams |
| 5,351,545 A | 10/1994 | Lucas |
| 6,131,461 A | 10/2000 | Leist |

*Primary Examiner*—Richard A. Moller
(74) *Attorney, Agent, or Firm*—Carlson, Gaskey & Olds

(57) ABSTRACT

Flexure assemblies include steel plates or pieces of metal material that are rigid in at least one direction but flexible in at least one other direction. One arrangement of components provides a flexure assembly that is intended to permit linear motion along an axis while preventing off-axis motion. Another arrangement of components permits rotary or pivotal motion about an axis within a limited range while preventing off-axis motion. All arrangements provide a frictionless and noiseless support arrangement that is well suited for test equipment where noise sensitivity and accuracy are of concern. The invention provides a testing device that permits test forces to be input directly to a vehicle body structure for testing vehicle squeak and rattle noises within a vehicle interior.

6 Claims, 14 Drawing Sheets

FLEXURE ASSEMBLY

This application is a division of application Ser. No. 09/690,607, filed Oct. 17, 2000, now U.S. Pat. No. 6,389,900, which is a continuation-in-part of application Ser. No. 09/377,122, which was filed on Aug. 19, 1999 now U.S. Pat. No. 6,131,461, claiming priority to U.S. provisional application No. 60/098,746, which was filed on Sep. 1, 1998.

BACKGROUND OF THE INVENTION

This invention generally relates to a flexure assembly that is useful for guiding motion of components in devices such as vibration test equipment.

A variety of vibration test devices are commercially available and commonly referred to as shakers or exciters or vibration generators. There are several basic components within most such devices including an armature suspended for movement relative to a stator. A coil is typically carried by the armature and located in an air gap between the armature and the stator. Permanent magnets are electromagnets are typically used to generate a D.C. magnetic field across the air gap. By feeding an alternating current through the coil, the armature is caused to reciprocate or vibrate along its longitudinal axis relative to the stator at the frequency of the applied alternating current.

Since the armature must move relative to the stator, it is typically mounted with a series of bearings and/or a plurality of peripheral suspension members. The bearings and suspension members serve the functions of centering the armature and allowing it to move along its longitudinal axis. Preferably, the armature is prevented from any lateral movement normal to the longitudinal axis along which the armature moves during vibration. A variety of bearings and suspension members have been proposed in the past, however, none have proven satisfactory for all conditions and circumstances. Typical problems with existing arrangements include distortion of the purity of the vibration motion caused by typical suspension members.

Additionally, conventional arrangements typically do not adequately restrict off-axis movement and do not provide the degree of accuracy that is needed in many situations. Moreover, none of the prior systems adequately address all of these issues.

An additional problem presented by conventional bearings and suspension members is that they typically introduce noise during the vibration movement. Any additional noise is undesirable under circumstances where the purpose of the vibratory test is to determine squeaks and rattles within an item that is being tested. One example includes instrument panels that are included in passenger vehicles. During a testing operation, the ability to detect squeaks and rattles within an assembled instrument panel is compromised by extraneous noises that are created by the bearings or suspension members within the testing device.

Therefore, there is a need for an improved assembly that will allow for an armature within a vibration testing device to move along its longitudinal axis while also preventing any cross-axis motion and doing so with minimal noise. This invention addresses those needs and overcomes the shortcomings and drawbacks of the prior art described above.

Another type of motion that is often needed for testing is rotary or pivotal motion. Conventional arrangements do not adequately accommodate such motion. Hinge or bearing arrangements typically do not limit off-axis motion sufficiently. Additionally, friction and noise typically are concerns and cause problems.

Additional problems are presented when shakers are used in a laboratory setting or any manufacturing facility for performing product validation and squeak and rattle testing for complete automotive vehicles, for example. Typically, simulated road conditions are input to the vehicle through the tire patch and chassis suspension. Typical equipment arrangements induce large displacements (up to 4 inches) and large forces (up to 10,000 pounds). To achieve these results, hydraulic actuators are typically used.

There are many shortcomings and drawbacks with conventional road simulators used as squeak and rattle testing devices. Most arrangements create high noise levels that mask the existence, and impede the identification of squeaks and rattles in the vehicle interior. The noise of the testing equipment makes it difficult to distinguish between squeak and rattle noises within the vehicle and those caused by the testing equipment. It is most important to minimize or eliminate ambient test equipment noises. Otherwise, the technicians are left with a subjective assessment that requires them to separate and discriminate the test equipment noises from actual vehicle squeak and rattle noises. This renders objective measurements difficult, uncorrelated and typically unreliable.

Another shortcoming associated with conventional arrangements is that the maximum frequency for inducing motion of the vehicle is typically limited to approximately 100 Hz. These limitations are usually associated with performance limitations of hydraulic actuators. For example, hydraulic arrangements can seldom achieve higher frequencies, but even if they do, the relatively high pressure oil arrangements are sometimes considered a safety or environmental concern. Squeaks and rattles within a vehicle are typically identified at higher frequencies in the range from about 300 to 500 Hz. Conventional arrangements are often not capable of exciting at these higher frequencies thus restricting a technician from identifying possible sources of undesirable noise.

Another shortcoming with conventional road simulating test equipment is that it is typically very expensive to purchase and install. Large masses or foundations are typically needed to react the large forces introduced by the test equipment, which complicates and increases the expense of the installation. Additionally, hydraulic power supplies are expensive to operate and maintain and are associated with high power consumption and other environmental issues.

Utilizing the innovations of this invention, avoids the drawbacks and shortcomings of prior arrangements. This invention provides the possibility for testing for squeaks and rattles within a vehicle unlike what has been achieved in the past.

SUMMARY OF THE INVENTION

In general terms, this invention is a flexure assembly that is useful for supporting and guiding components in a testing assembly that repeatedly moves an object in a chosen direction. A device designed according to this invention is particularly useful for testing squeak and rattle noises in a vehicle. The inventive device includes a vibration source that has a moving portion that moves reciprocally along a vibration axis. A plurality of flexure assemblies permit movement of the moving portion along the vibration axis and restrict movement of the moving portion in other directions. A transition member is adapted to directly engage the vehicle body structure to transmit motion of the moving portion to the vehicle body structure.

In a preferred embodiment, the transition member has a first end adapted to engage the vehicle body structure and a second end that is adapted to engage the moving portion of the vibration source. A midportion of the transition member has a pivot axis about which the transition member pivots responsive to movement of the moving portion of the vibration source. The inventive arrangement also preferably includes a noiseless flexure pivot assembly at the pivot axis that permits the transition member to pivot about the pivot axis without making any audible noise.

In the preferred arrangement, the flexure pivot assembly includes at least two pivot members that each permits movement in one direction but resist movement in other directions. The pivot members are positioned relative to each other such that the transition member is permitted to pivot about the pivot axis, but is restrained from moving in other directions. The ends of the pivot members preferably remain fixed relative to each other at each end of the assembly. The flexure pivot assembly of this invention provides a noiseless arrangement, which is especially useful for detecting squeaks and rattles in a vehicle.

DETAILED DESCRIPTION OF A PREFERRED EMBODIMENT

Figure 1:
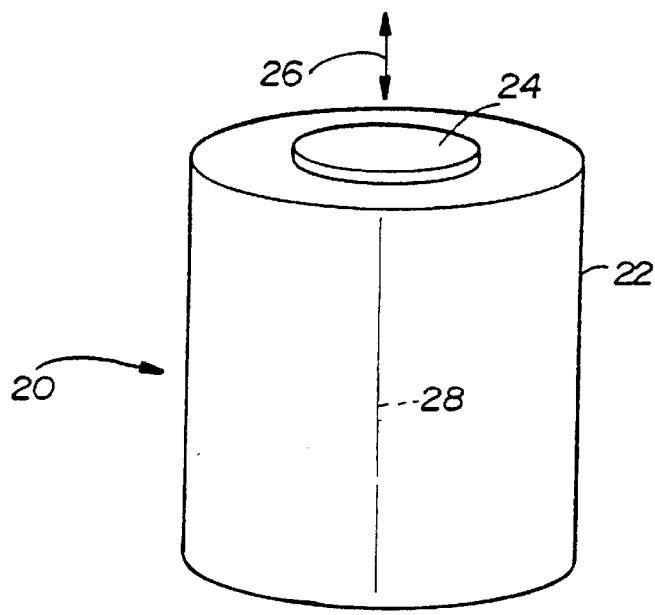
FIG. 1 is a perspective, diagrammatic illustration of a vibration test device.

FIG. 1 diagrammatically illustrates a vibration test device 20. A generally cylindrical housing 22 supports a plurality of components that allows a moving member 24 to move reciprocally as indicated by the arrows 26 along a vibration axis 28.

Figure 2:
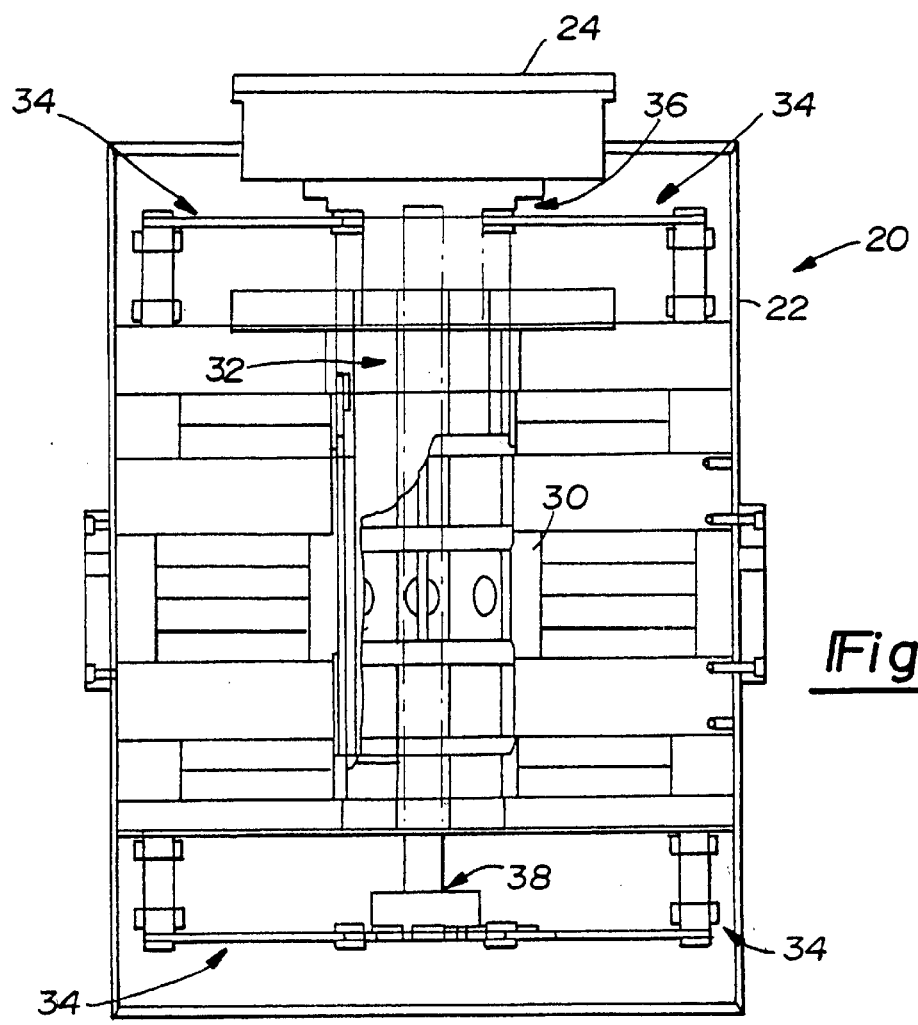
FIG. 2 is a partially cross-sectional view of the embodiment of FIG. 1.

FIG. 2 diagrammatically illustrates some of the internal components of the device 20. A stator 30 is rigidly supported within the housing 22 so that it remains stationary with the housing. An armature 32 is supported by a plurality of flexure assemblies 34 so that the armature 32 can move along the vibration axis 28 responsive to an alternating current being applied to a coil (not specifically illustrated) associated with the armature 32. As the armature 32 moves back and forth along the vibration axis 28, the moving member 24 moves relative to the housing 22. In some embodiments the moving member 24 and the armature 32 are integrally formed as a single piece. In other examples, the moving member 24 and the armature 32 are separate pieces that are rigidly attached together so that they move in unison. By supporting a device on the moving member 24, the desired vibration test can be carried out in a generally conventional manner.

The flexure assemblies 34 preferably support a first end 36 and a second end 38 of the armature 32. The flexure assemblies 34 permit the armature 32, and the moving member 24, to move back and forth along the vibration axis 28. The flexure assemblies 34 also provide lateral stiffness and do not allow the armature 32 to move in any direction normal to the vibration axis 28. Moreover, the flexure assemblies 34 provide a frictionless and noiseless support for the armature 32, which is extremely advantageous in a wide variety of applications. Although the illustrated embodiment shows flexure assemblies at each end of the armature, there may be situations where a flexure assembly at only one end is sufficient. The minimum requirements in many situations are that the moving member 24 and the test item supported by it do not experience any off-axis motion during a vibration test procedure.

Figure 3:
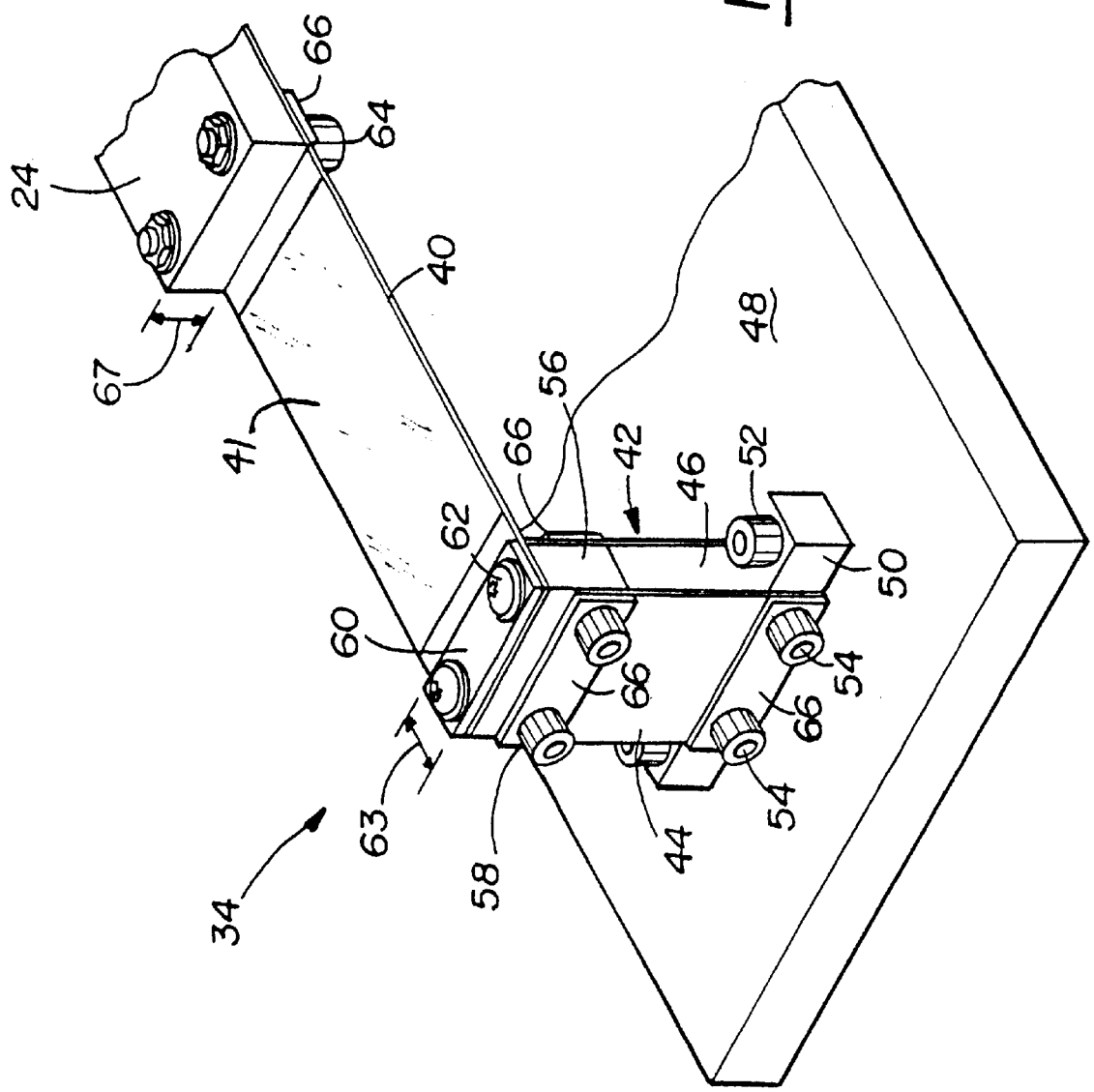
FIG. 3 is a perspective illustration of a preferred embodiment of a flexure assembly designed according to this invention.

FIG. 3 shows the flexure assembly 34 in greater detail. A flexure arm 40 preferably is generally planar, rectangular, thin and made from a stiff material. Most preferably, stainless steel is used, but other materials may be used. A first end of the flexure arm 40 is rigidly connected to the moving member 24. The opposite end of the flexure arm 40 is connected to a support subassembly 42. The illustrated example has one piece of material as the flexure arm 40, but this invention includes arrangements with flexure arms that are made from two or more layers of material. It is most preferred to include dampers 41 on the flexure arms 40. The dampers 41 reduce resonant response that otherwise would have a tendency to generate noise at some frequencies. It is currently preferred to adhesively secure a layer of elastomeric material to the large surface area of the flexure arms 40. In the currently preferred embodiment, damping pads available from Tech Products in Dayton, Ohio are used for the dampers 41. For simplicity, the dampers 41 are not specifically illustrated in the remaining drawings, although they may be used in any illustrated example as needed.

First and second flexure leaves 44 and 46 preferably are also rectangular, relatively thin and made from a rigid material. One end of the flexure leaves 44 and 46 is supported against a rigid base 48 by a mounting block 50. The mounting block 50 also serves to space the flexure leaves 44 and 46 apart by a desired distance, which is equal to the thickness of the mounting block 50. A set of conventional fasteners 52, such as screws, secures the mounting block 50 to the base 48. In most embodiments, the base 48 is a member that is rigidly supported within the housing 22 of a vibration testing device, for example. The form of the base 48 is not important, only that it stay stationary relative to the moving member 24 as necessary. An additional set of fasteners 54, such as nuts and bolts are used to secure the first end of the flexure leaves 44 and 46 to the mounting block 50. A second mounting block 56 is provided at the second end of the flexure leaves 44 and 46. A set of conventional nuts and bolts 58 secure the flexure leaves to the mounting block 56. The combination of the mounting blocks 50 and 56 and the flexure leaves 44 and 46 make up the essential components of the support subassembly 42. The illustrated example includes only one leaf 44 and one leaf 46, but it is within the scope of this invention to utilize more than one flexure leaf at each side of the subassembly 42 so that there are more than two flexure leaves in the support subassembly.

A flexure clamp block 60 preferably is provided at the second end of the flexure arm 40, which is rigidly secured to the mounting block 56. The flexure clamp block 60 preferably is placed between the upper (according to the drawing) surface of the flexure arm 40 and fastening elements 62, which are used to secure the flexure arm 40 the mounting block 56. The fastening element 62 can be conventional screws, for example. Accordingly, the flexure clamp block serves to prevent deformation to the flexure arm 40 where the fastening elements 62 secure the flexure arm 40 to the mounting block 56. Moreover, the combination of the mounting block 56 and the flexure clamp block 60 maintain at least a portion of the length of the flexure arm 40 in a desired orientation at all times. The section of the flexure arm 40 indicated at 63 remains parallel to the base 48 at all times as will be described below.

The opposite end of the flexure arm 40 is secured to the moving member 24 using conventional fasteners 64 such as nuts and bolts. A clamp block 66 preferably is placed on the opposite face of the flexure arm 40 from the moving member 24. The clamp block 66 provides that a portion of the length of the flexure arm 40 indicated at 67 does not flex during movement of the moving member 24. At least the portions of the flexure arm 40 indicated at 63 and 67 remain parallel to the base 48 at all times. Similar clamp blocks 66 preferably are placed on the flexure leaves 44 and 46 at the points where the flexure leaves are connected to the mounting blocks 50 and 56, respectively. The clamp blocks 66 used on the flexure leaves 44 and 46 provide the same functions as the clamp blocks 60 and 66 used with the flexure arm 40. Depending on the location of each clamp block, the dimensions can be varied so that different thicknesses or surface areas are used.

Figure 4A:
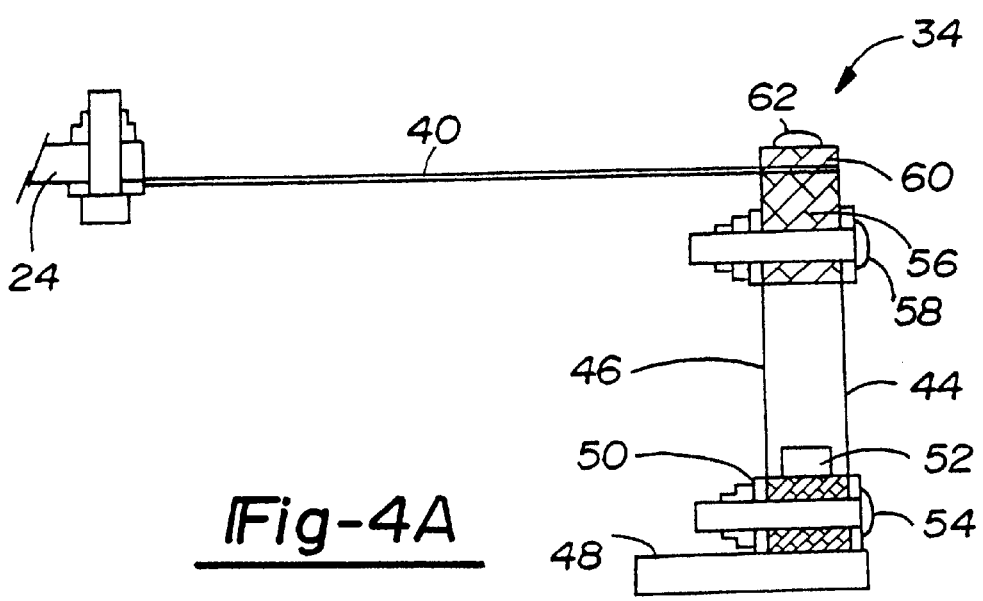
FIGS. 4A and 4B are side, partially cross-sectional illustrations of the embodiment of FIG. 3.
Figure 4B:
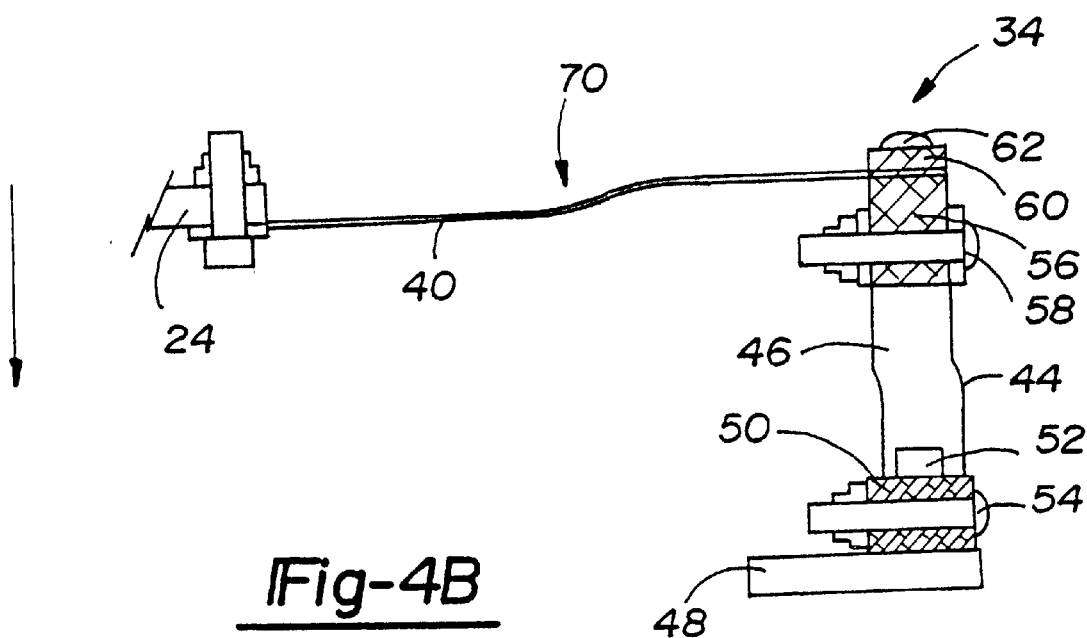

Referring to FIGS. 4A and 4B the movement of the flexure assembly is schematically illustrated. FIG. 4A shows the moving member 24 in a first position. FIG. 4B illustrates the moving member 24 having moved downward (according to the drawings) from the position in FIG. 4A. As can be appreciated from FIG. 4B, the flexure arm 40 bends in the direction of the longitudinal vibration axis 28. A generally "S" shaped configuration 70 is imposed on the flexure arm 40. The portions 63 and 67 of the flexure arm 40 remain parallel to the base 48 and only the central portion of the flexure arm bends during movement of the moving member 24. At the same time, the flexure leaves 44 and 46 bend in a similar fashion. The amount of bending of the flexure arm 40 and the flexure leaves 44 and 46 is exaggerated in FIG. 4B for illustration purposes only. As can be appreciated from FIGS. 4A and 4B any movement of the first end of the arm 40, which is connected to the moving member 24, and the end of the flexure leaves 44 and 46 which are secured to the mounting block 56, is such that the orientation of the ends of the flexure arm 40 and the ends of the flexure leaves 44 and 46 do not rotate relative to the plane that each is in while the flexure assembly 34 is in a rest position.

Figure 5:
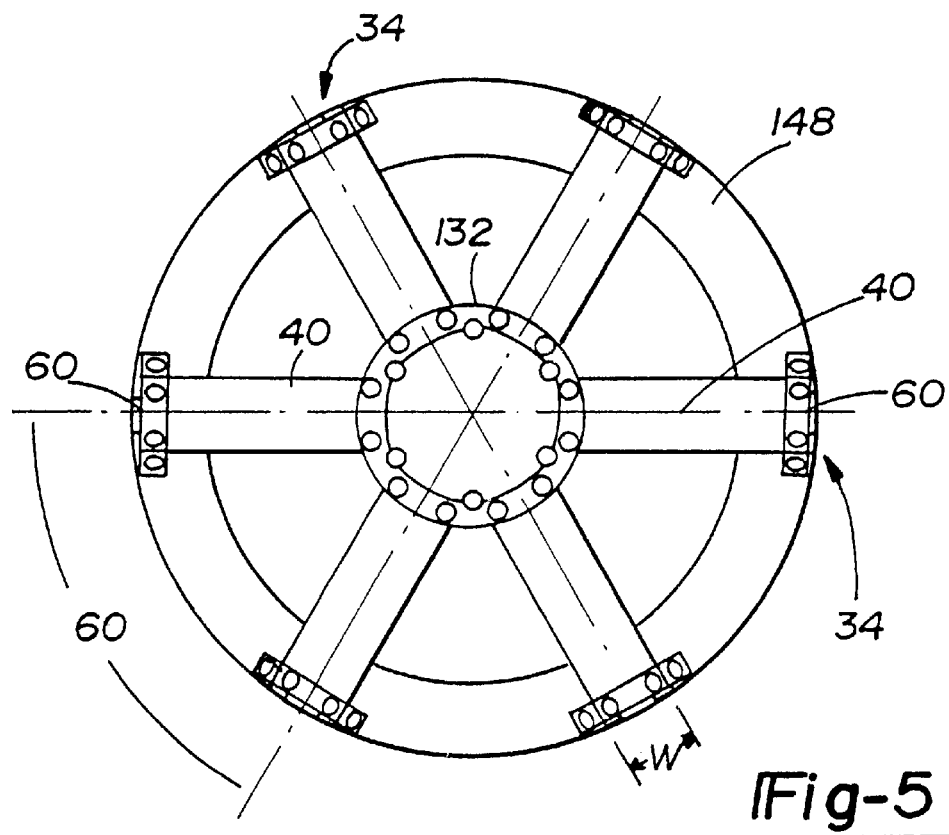
FIG. 5 is a diagrammatic illustration of an arrangement of a plurality of flexure assemblies as illustrated in FIG. 3.

A plurality of flexure assemblies can be used in a variety of orientations to allow a moving member such as the armature 32 to move along a vibration axis while preventing any lateral or torsional movement relative to the vibration axis. FIG. 5 illustrates one arrangement of a plurality of flexure assemblies 34 about a reciprocating member 132. The base 148 is a generally circular member that would be supported within a housing 22 of a vibration test device, for example. The arrangement of six flexure assemblies 34 spaced apart by approximately sixty degrees provides for a very stable arrangement. Different numbers of assemblies 34 and different spacing or arrangements also may be used, as desired. Those skilled in the art will be able to choose the ideal arrangement to suit the needs of a particular situation.

There are limitations to an embodiment like that shown in FIG. 5, however. For example, the width of the flexure arms 40, which is measured as shown by w in FIG. 5, is limited by the size of the available connecting surface on the armature 132. Since some applications require more lateral stiffness than others, it is desirable to use flexure arms 40 having greater widths under such circumstances.

Figure 6:
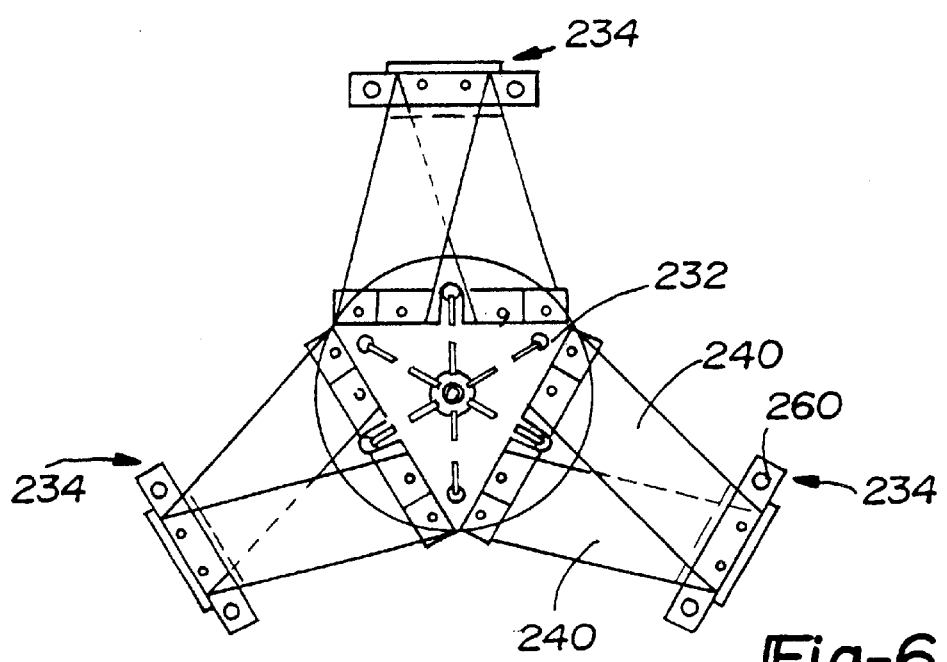
FIG. 6 is a diagrammatic illustration of an arrangement of flexure assemblies having further advantages compared to the arrangement of FIG. 5.

The embodiment of FIG. 6 shows the most preferred arrangement of flexure assemblies 234 when a generally circular connecting surface is provided on an armature 232. The arrangement illustrated in FIG. 6 greatly increases the edge bending stiffness of the flexure assembly 234. By using six flexure arms 240 in the arrangement illustrated in FIG. 6, the same cross-axis stiffness is provided that otherwise would only be achievable by using stacks of at least two and possibly including more than four flexure arms 40, which would require substantially more material and parts than the arrangement of the embodiment of FIG. 6. The flexure assemblies 234 are illustrated in more detail in FIG. 7.

The flexure assemblies 234 each include two or more flexure arms 240 having one end supported against the mounting block 256. The clamping block 260 and an additional spacer, clamping block 272 is provided to secure the ends of the flexure arms 240 and to keep them spaced apart a desired distance. Flexure leaves 244 and 246 operate in the same general manner as the flexure leaves 44 and 46 described above. The same is true of the mounting block 250 and the remaining components illustrated in FIG. 7, which have numbers similar to those used in FIG. 3 but increased by 200.

Figure 7:
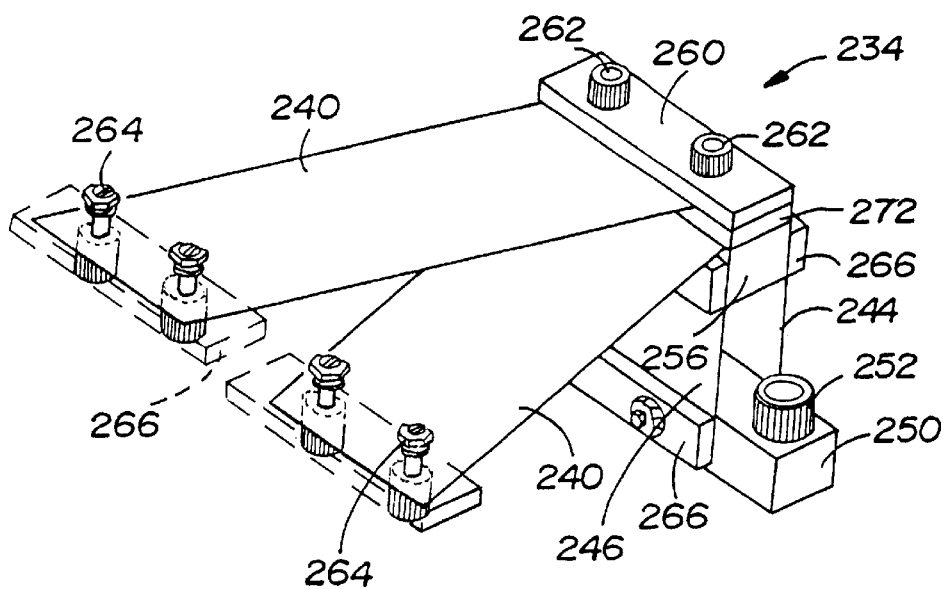
FIG. 7 is a perspective illustration of the flexure assemblies used in the embodiment of FIG. 6.

The arrangement of FIGS. 6 and 7 provides significant advantages in achieving greater off-axis stiffness. Achieving greater stiffness can be accomplished in anyone of the illustrated embodiments by increasing the width of the flexure arm, increasing the thickness of the flexure arm or stacking multiple flexure arms on top of one another. Additionally, the width or thickness of the flexure leaves may be increased to achieve the same results. Stacking multiple flexure leaves together also provides increased thickness. Of course, a combination of two or more such modifications can be used effectively. While each of these options may be workable in some circumstances, they are not without limitations and drawbacks. For example, the width of the flexure arm can only be increased as much as there is accommodating support surface on the connecting portion of the armature, for example. Increasing the thickness of a flexure arm is not always desirable because greater thickness disproportionally increases the stiffness of the flexure assembly in the desired direction of motion. For example, increasing the width of a flexure arm gives an additional stiffness that is approximately proportional to the increase in the width. Increasing the thickness, however, increases the stiffness in the axial direction approximately proportional to the product of the thickness times itself three times (i.e., thickness). In many circumstances, increasing the stiffness in the axial direction by a significant amount will detract from the ability of the vibration device 20 to operate as desired. Accordingly, using the arrangement as illustrated in FIG. 7, for example, minimizes the amount of material needed and provides the greatest off-axis stiffness while still allowing for a desired amount of stiffness in the axial direction.

In applications where a circular arrangement of flexure assemblies is necessary, a minimum of three flexure assemblies 34 preferably are utilized to achieve the desired amount of stiffness in directions other than the axial direction of movement. In embodiments having a rectangular armature or moving member at least four flexure assemblies are provided. Providing four flexure assemblies at each end of the armature is best although less than four may be provided at one end with four being provided at an opposite end depending of the needs of a particular situation.

Figure 8:
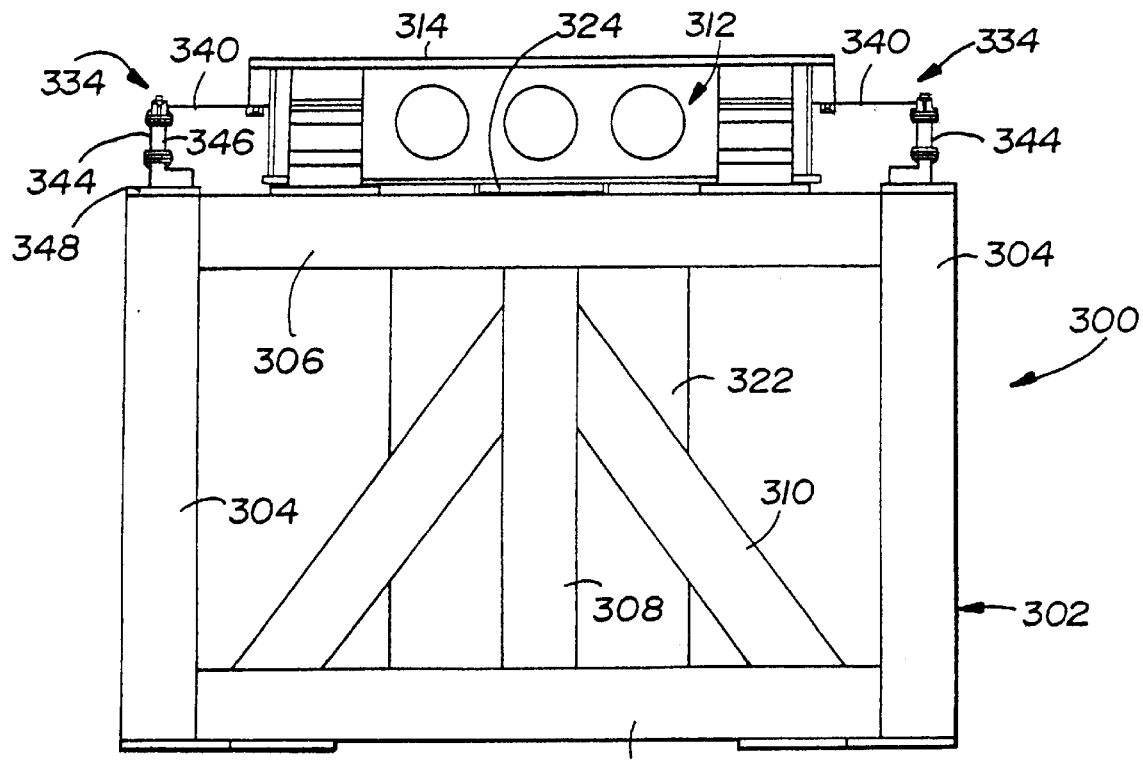
FIG. 8 is a side elevational view of a vibration test device.
Figure 9:
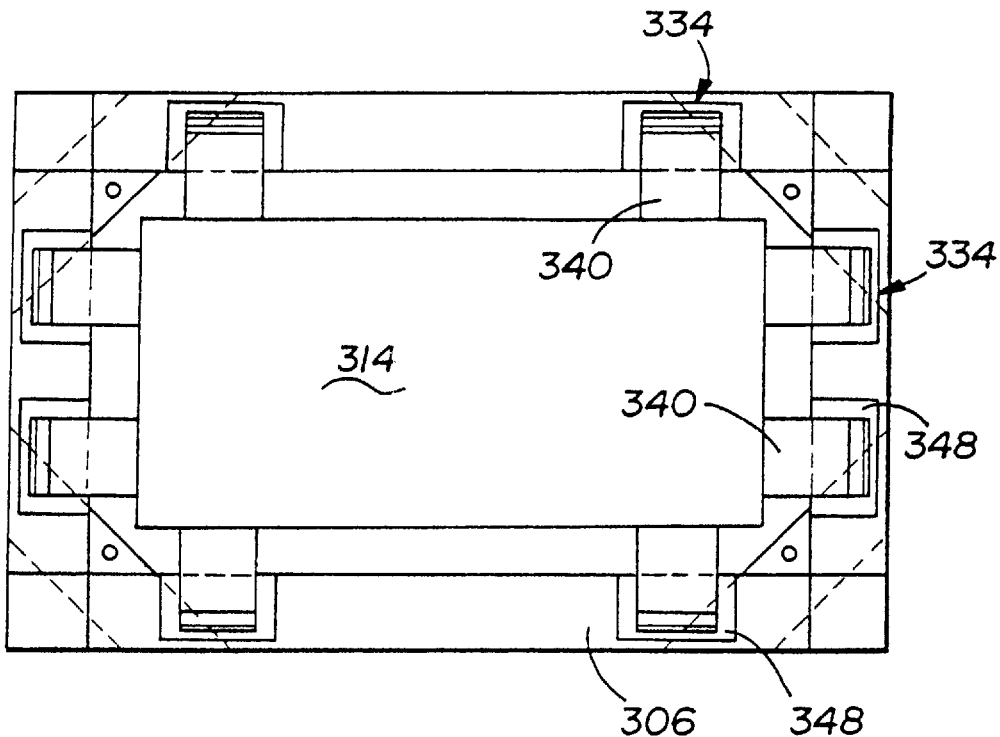
FIG. 9 is a top elevational view of the embodiment of FIG. 8.
Figure 10:
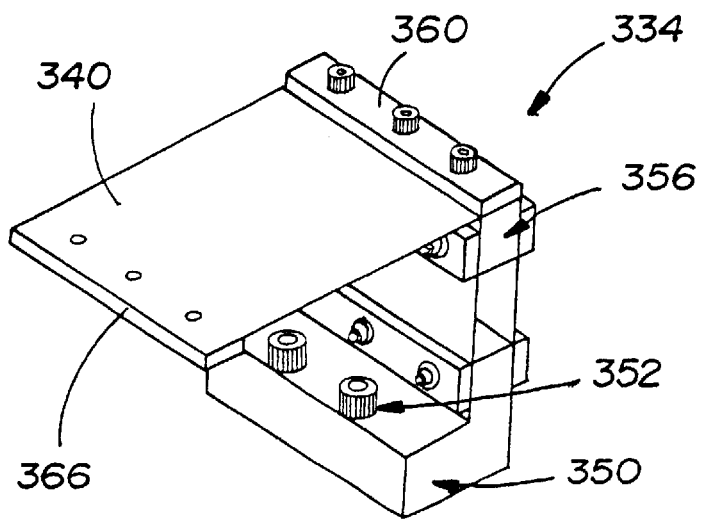
FIG. 10 is a diagrammatic, perspective illustration of a flexure assembly used in the embodiment of FIGS. 8 and 9.

FIG. 8 illustrates a small head expander assembly 300 including a supporting frame 302 that is made up of a plurality of vertical supports 304 and horizontal supports 306. Internal vertical supports 308 and angled struts or beams 310 are also provided to create a stiff support structure 302 as is known in the art. A shaker device is supported within the structure 302 in a conventional manner. The connection of the head expander table 312 and the moving member 324 provides a surface 314 for supporting a device to be vibrated and tested. A plurality of flexure assemblies 334 are secured to the table 312 as illustrated in FIGS. 8 and 9. The flexure assemblies 334 are illustrated in more detail in FIG. 10. The flexure assembly 334 includes basically the same components of the embodiment of FIG. 3. The differences between the assembly 334 and that described above are that the flexure arm 340 has a slightly different configuration. The difference between the length and width of the flexure arm 340 is not as great in the embodiment of FIG. 10 compared to the embodiment of FIG. 3. Additionally, the mounting block 350 has a generally L-shaped cross-section compared to the simple rectangular arrangement used in the embodiment of FIG. 3. Otherwise, the flexure assembly 334 operates in a manner like that described above.

By providing eight flexure assemblies 334, a stable arrangement is provided that allows the supporting surface 314 to move along the vibration axis without any off-axis motion.

Figure 11:
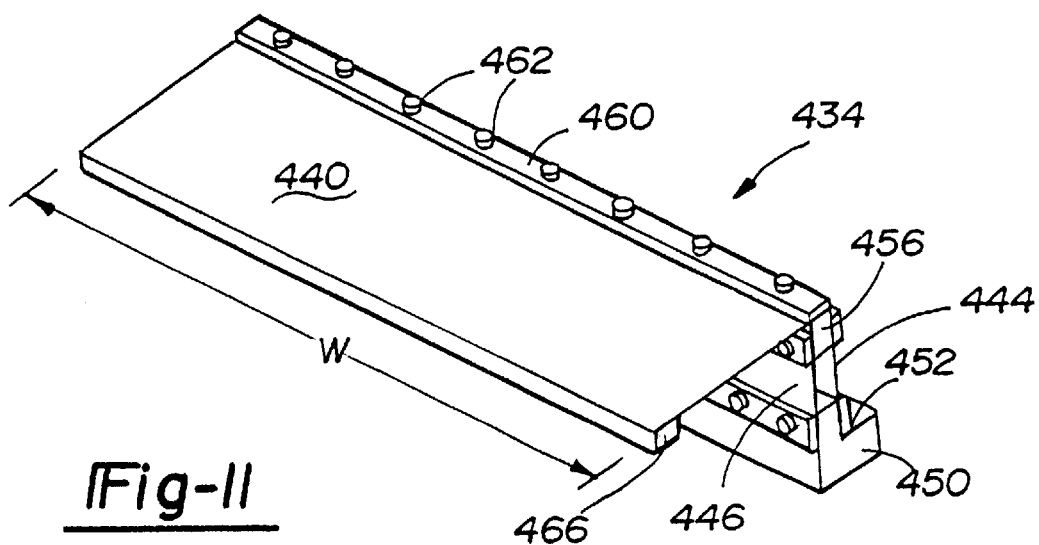
FIG. 11 is a perspective, diagrammatic illustration of another embodiment of a flexure assembly designed according to this invention.
Figure 12:
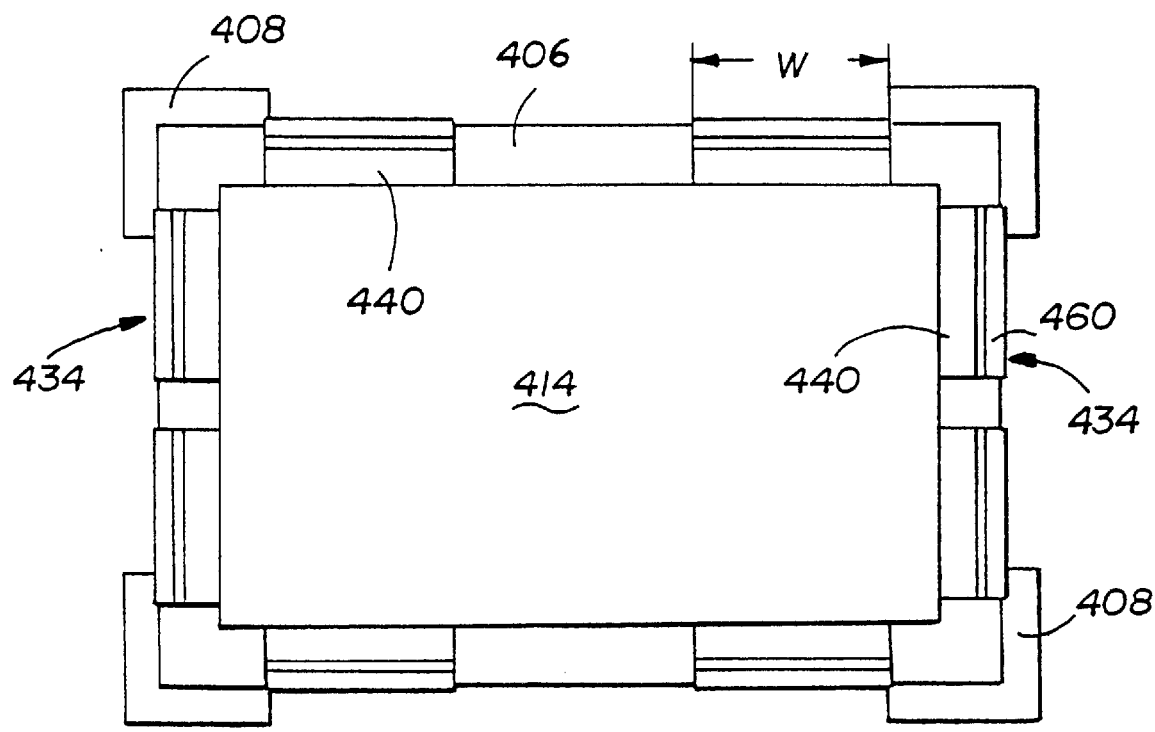
FIG. 12 is a top elevational view of another vibration test device.
Figure 13:
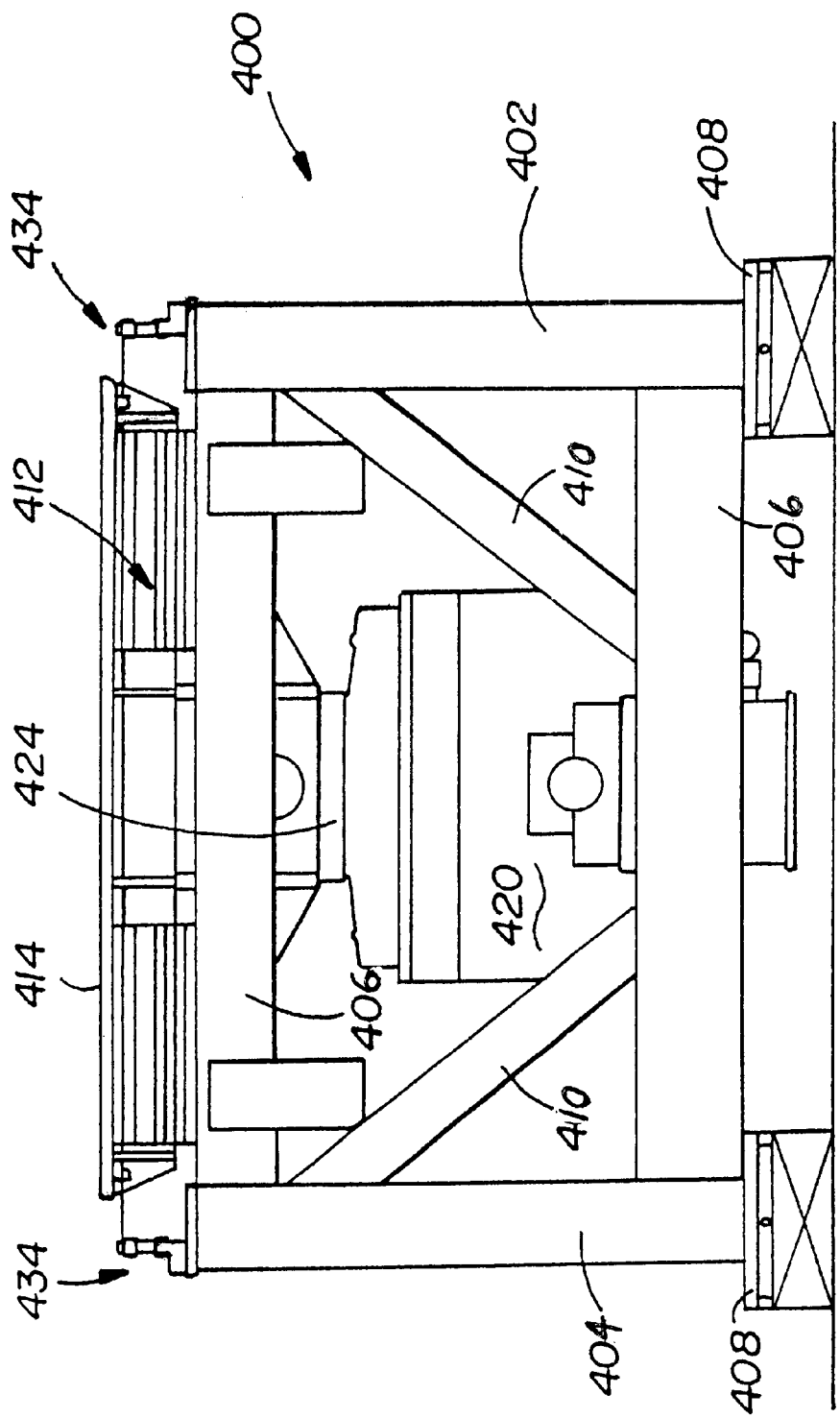
FIG. 13 is a side elevational view of the embodiment of FIG. 12.

FIGS. 11 through 13 illustrate another embodiment of a head expander that is much larger than that of FIGS. 8 and 9. As shown in FIG. 11, the width w of the flexure arm 440 is substantially greater than its length. This embodiment may be used in vibration generators or shakers that generate as little as 25 force pounds or as much as 50,000 force pounds, for example. The supporting surface 414 in one example measures 36" by 60". In this example, the flexure arms 440 preferably are 16" wide. Since the flexure arms 440 are much wider, a larger plurality of connecting elements 462, are used to secure the flexure arm 440 to the moving table 412 and the mounting blocks 450. These dimensions are but one set of an infinite number of possibilities for this type of embodiment.

Figure 14:
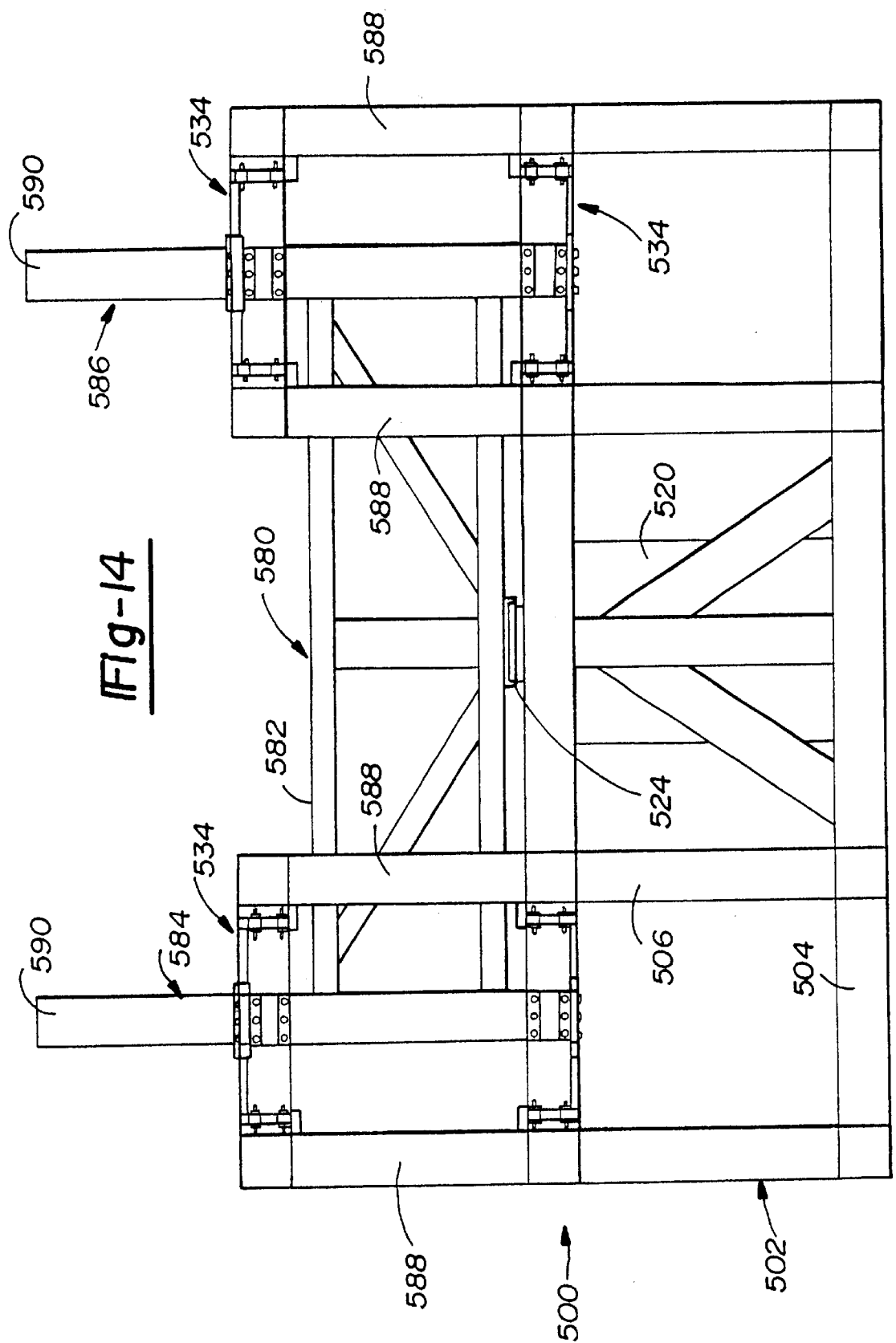
FIG. 14 is a side elevational, diagrammatic illustration of another vibration test device utilizing flexure assemblies designed according to this invention.

FIG. 14 illustrates another vibration test fixture 500. This embodiment includes a base structure made up of vertical components 502 and horizontal support beams 504. The moving structure 580 includes three surfaces 582, 584 and 586 upon which a device to be tested can be supported. The moving structure 580 is supported on the base structure through vertical posts 588 that are supported on the base structure elements 502 and 5t04. A plurality of flexure assemblies 534 support posts 590 for movement relative tot he supports 588. In this embodiment, the shaker device 520 causes movement of the moving member 524, which in turn causes the structure 580 to vibrate about a vibration axis. Eight flexure assemblies 534 preferably support each of the posts 590. In the illustrated embodiment, the posts 590 are rectangular and four flexure assemblies 534 are provided at the bottom end (according to the drawing) and approximately midway along the length of each post, respectively. The eight flexure assemblies 534 on each post provide a stable arrangement for each post 590 even when high magnitudes of force are applied.

Figure 15:
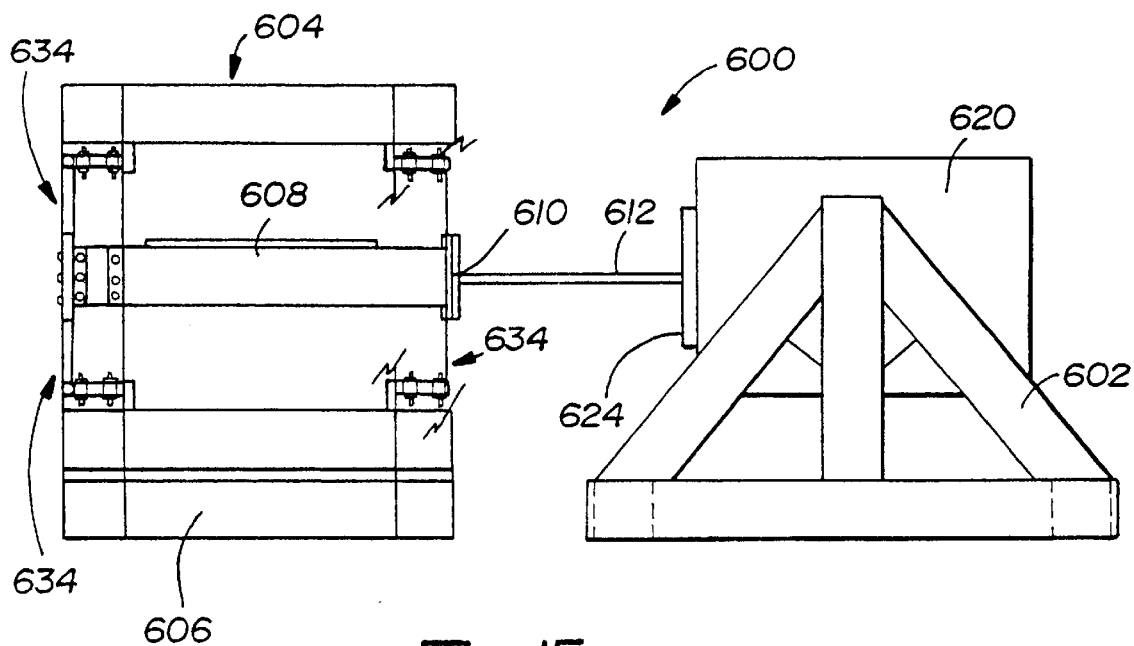
FIG. 15 diagrammatically illustrates another vibration test device.
Figure 16:
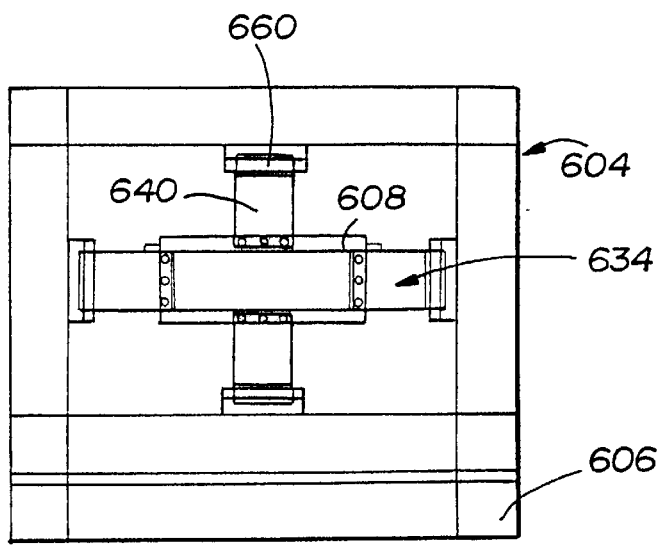
FIG. 16 is a side elevational view taken from the left of the embodiment of FIG. 15.

FIGS. 15 and 16 diagrammatically illustrate another embodiment of a vibration testing device 600. A base 602 supports a shaker device 620 so that the moving member 624 moves along a horizontal vibration axis (according to the drawing). A support structure 604 is mounted on a base 606. The support structure 604 supports a moving member 608. The moving member 608 is coupled with the moving member 624 by a connecting plate 610 and connecting rod 612, respectively. A plurality of flexure assemblies 634 support and guide the moving member 608 so that it moves along a horizontal vibration axis. In the illustrated embodiment (as best seen in FIG. 16) the moving member 608 is rectangular and preferably includes four flexure assemblies 634 at each end.

Figure 17:
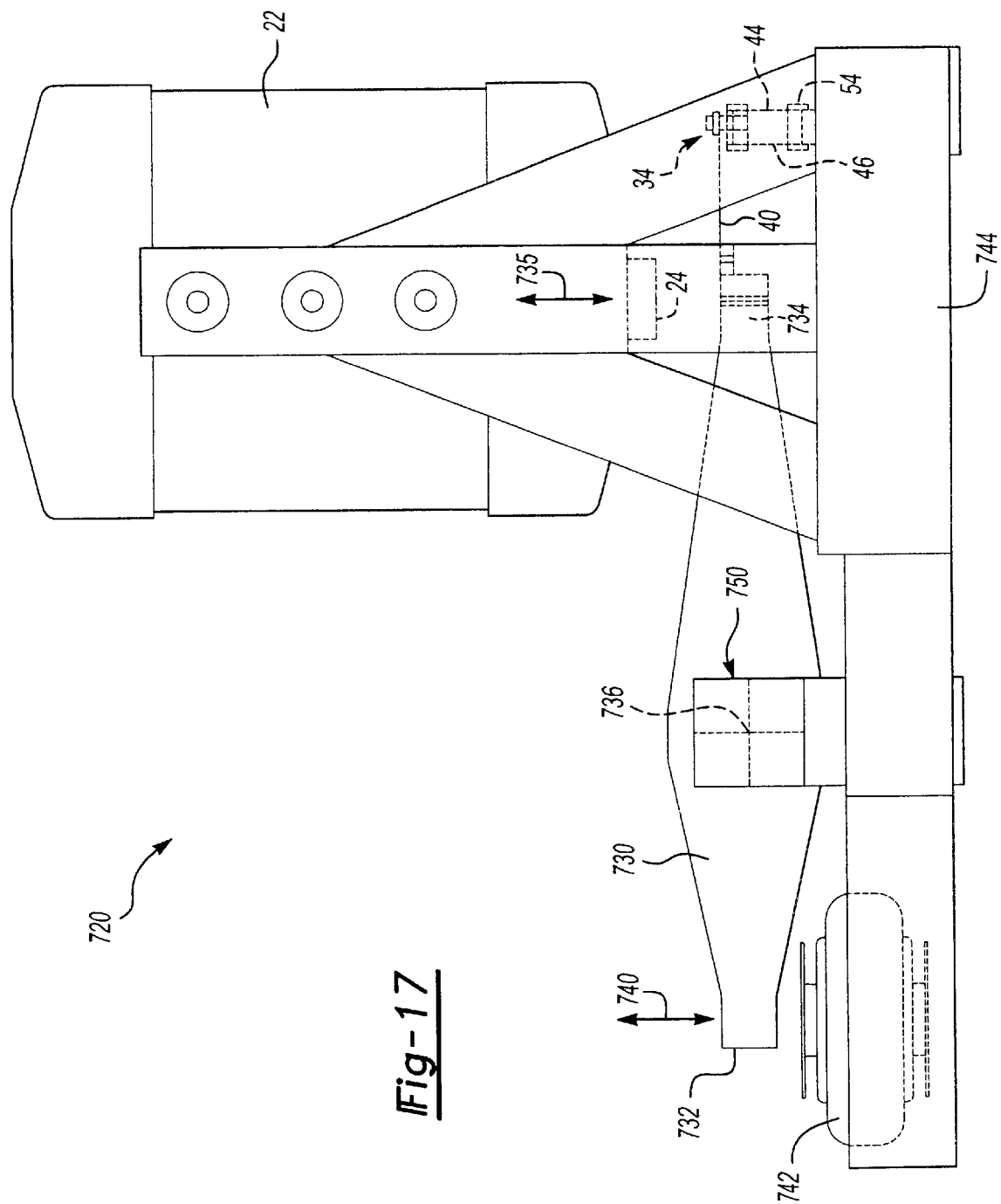
FIG. 17 is a schematic illustration of a direct vehicle body application designed according to this invention seen from a side view.
Figure 18:
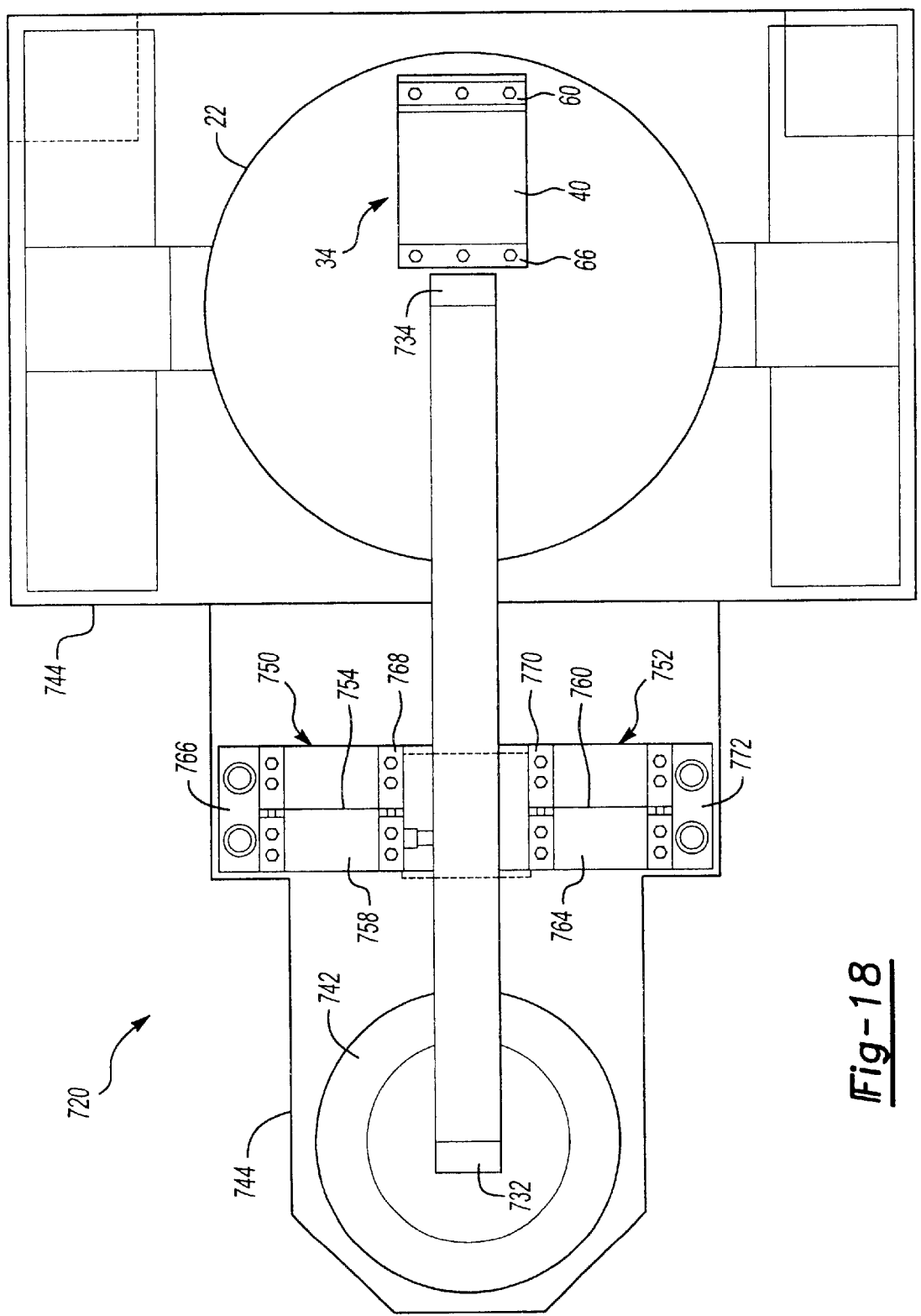
FIG. 18 is a top view of the embodiment shown in FIG. 17.

One particularly useful situation to employ flexure assemblies designed according to this invention is for squeak and rattle detection in vehicles. A system designed according to this invention allows the forces from the testing device to be applied directly to the body of the vehicle. This avoids the need to apply forces through the vehicle wheels or suspension system. One example implementation of this invention for direct body excitation is schematically illustrated in FIGS. 17 and 18.

A testing assembly 720 includes a shaker 22 with a moving portion 24 as previously described. A transition member 730, which is a lever in the illustrated example, transmits movement of the moving portion 24 directly to the vehicle body. One end 732 of the transition member 730 is adapted to directly engage the vehicle body structure at a suitable, rigid location. The other end 734 is adapted to engage the moving portion 24 of the shaker 22. As the moving portion 24 moves reciprocally as shown by the arrow 735, the transition member 730 pivots about the pivot axis 736. This motion results in back and forth motion as shown by the arrow 740 at the end 732 of the lever 730.

In the preferred embodiment, an actuator 742 preferably is provided near the end 732 of the transition member 730. In the illustrated example, the actuator 742 is an air-based device that is selectively adjustable to control the bias of the position of the transition member 730. The bias provided by the actuator 742 maintains the vehicle at a desired height. This is useful, for example, in controlling the system when individuals enter or exit the vehicle during a testing procedure.

In the preferred embodiment, the actuator 742, the transition member 730 and the shaker 22 are all supported on a base 744. In one example, the base 744 comprises a piece of steel. The base 744 preferably is movable within a testing facility to appropriately place the end 732 of the transition member 730 near the desired portion of the vehicle body to complete a testing procedure.

The end 734 of the transition member 730 preferably is coupled with a flexure assembly 34 as described above. The flexure assembly 34 associated with the end 734 of the transition member 730 prevents any side-to-side motion of the transition member 730 and assists to limit the motion of the transition member 730 only about the pivot axis 736.

A flexure pivot assembly 750 on one side of the lever 730 and a flexure pivot assembly 752 on the other side of the lever 730 permit pivotal motion about the pivot axis 736 while restricting motion in other directions. The flexure pivot assemblies 750 and 752 preferably include a plurality of pivot members that permit motion in one direction but restrict motion in other directions. In the currently preferred embodiment, each flexure pivot member resembles a flexure arm 40 as illustrated and discussed above. The flexure pivot members preferably each comprise a generally planar sheet of metal material. In the currently preferred embodiment, stainless steel is the material of choice.

Figure 19:
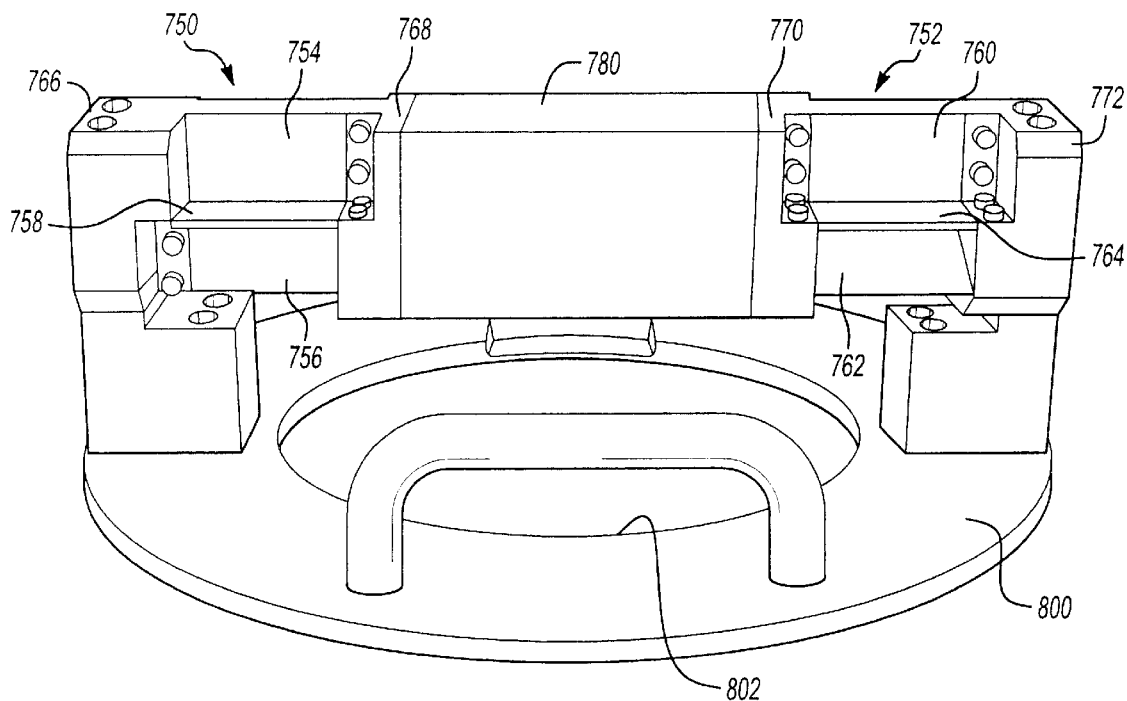
FIG. 19 is a perspective view of another embodiment of this invention.
Figure 20:
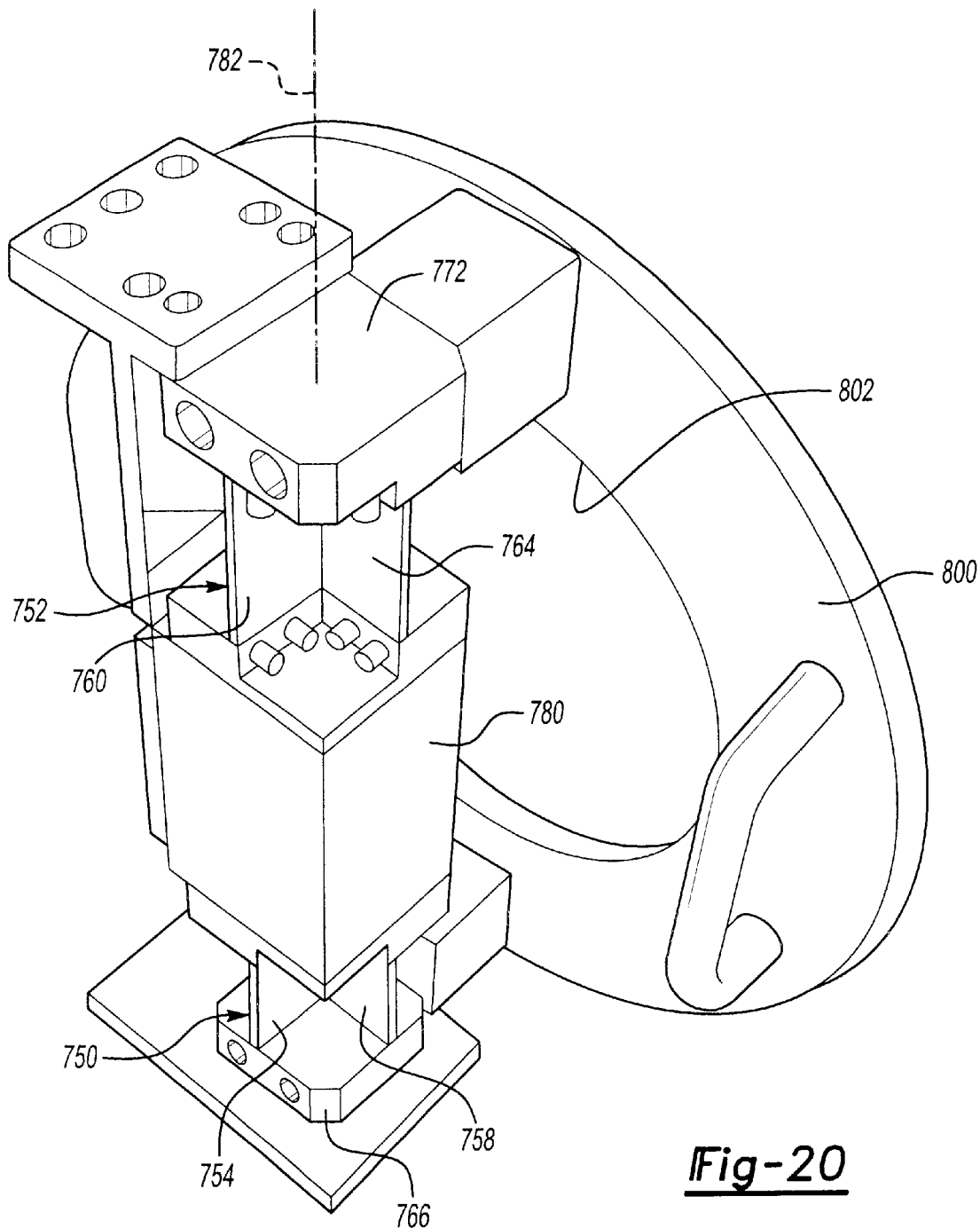
FIG. 20 is a perspective view of the embodiment of FIG. 19 seen from another perspective.

As seen in FIGS. 18 through 20, each flexure pivot assembly preferably includes a plurality of flexure pivot members. The flexure pivot assembly 750 includes a first pivot member 754 that is aligned with a pivot member 756. Between those two pivot members is a third pivot member 758. In the illustrated example, the third pivot member 758 preferably is twice as wide as each of the first and second pivot members 754 and 756.

In the flexure pivot assembly 752, a first pivot member 760 is aligned with a second pivot member 762. A third pivot member 764 intersects the two and preferably is perpendicular to each. The line intersecting the planes within which each of the flexure pivot members lies, preferably is coincident with the pivot axis about which the subject device will rotate or pivot. In most embodiments, the pivot axis is aligned with an edge of at least one of the pivot members. In some embodiments, the pivot axis is aligned with an edge of all of the pivot members.

Each end of the pivot members preferably is rigidly secured to a chosen structure. In the illustrated examples, the flexure pivot assembly 750 includes a first mounting block 766 and a second mounting block 768. Each of the mounting blocks includes a plurality of surfaces for receiving corresponding ends on the flexure pivot members. The ends of the flexure pivot members at each mounting block remain fixed relative to each other. Similarly, the assembly 752 includes mounting blocks 770 and 772.

The arrangement and composition of each of the flexure pivot members allows for some rotation about the pivot axis. Because the stainless steel material is stiff in one direction while being slightly flexible in another direction and because of the orientation of the flexure pivot members relative to each other, limited pivotal or rotary motion is provided. The pivot members twist slightly to allow for rotary motion along the pivot axis. The twisting is resilient in nature and not so great that deformations occur. The stiffness of the pivot members limits the amount of twisting and the amount of rotary motion. In the illustrated examples, a range of rotation up to approximately 10° is possible. The illustration of FIG. 18 provides for pivotal motion of the transition member 730.

In the illustrated examples, the two outer mounting blocks remain fixed relative to each other. The two inner mounting blocks remain fixed relative to each other and move relative to the outer blocks responsive to motion of the shaker moving portion. The mounting blocks 766 and 772 preferably remain fixed relative to a stationary base or shaker, depending on the specific arrangement. The mounting blocks 768 and 770 preferably remain fixed relative to each other and move with the rotating structure of the test equipment arrangement.

The example shown in FIGS. 19 and 20 includes a structure 780 that pivots about a pivot axis 782 responsive to an appropriate input force. A mounting base 800, which is suitable for being rigidly secured to an end of a shaker 22, supports the outer mounting blocks 766 and 772. An opening 802 through the center of the mounting base 800 allows a moving portion 24 of the shaker to move reciprocally as described above. Preferably, a flexure assembly 34 designed according to this invention is associated with one edge of the mounting structure 780 so that rectilinear motion of the moving portion 24 is translated into rotary motion of the structure 780 about the pivot axis 782.

Figure 21:
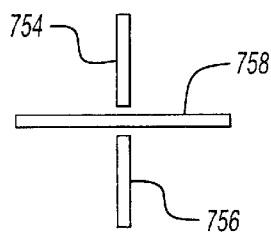
FIG. 21 schematically illustrates a first arrangement of flexure pivot members for a flexure pivot assembly designed according to this invention.

A variety of configurations are possible to realize the pivotal flexure assembly of this invention. FIG. 21 schematically illustrates an arrangement as shown in FIGS. 17 through 20. The flexure members 754 and 756 are aligned and lie within a single plane. The flexure member 758, which has a width that is approximately twice the width of the other two flexure members, is perpendicular to the flexure member 754 and 756. This cross-like configuration has proven effective to provide motion along a pivot axis that is coincident with the inner section of the planes in which the flexure members lay.

Figure 22:
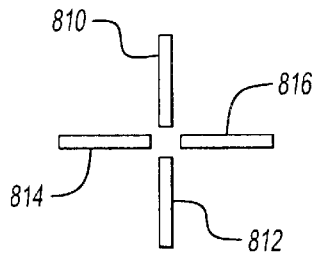
FIG. 22 schematically illustrates another arrangement of flexure pivot members.

FIG. 22 illustrates another embodiment where a first flexure member 810 and a second flexure member 812 are parallel with each other and within a single plane. Flexure members 814 and 816 are perpendicular to the other two flexure members. The flexure members 814 and 816 are parallel with each other and lie within a single plane.

Figure 23:
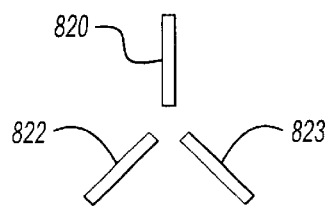
FIG. 23 illustrates another arrangement of flexure pivot members.
Figure 24:
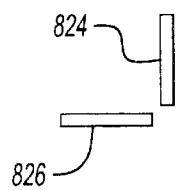
FIG. 24 schematically illustrates another arrangement of flexure pivot members.

FIG. 23 illustrates another arrangement, which is generally triangular. A flexure member 820 and a second flexure member 822 and a third flexure member 823 are each in different planes, which intersect along the pivot axis. Another example is shown in FIG. 24, which includes two flexure members. A first flexure member 824 is perpendicular to a second flexure member 826. The intersection point of the planes in which each flexure member is positioned (the lower right hand corner of FIG. 24) is the pivot axis in this embodiment. A variety of configurations are possible, but the cross-like arrangement is currently the most preferred because of its stiffness and control characteristics.

A flexure pivot assembly designed according to this invention provides for a noiseless, frictionless support structure that allows rotary or pivotal motion under controlled conditions. The inventive arrangement is far superior to any bearing or hinge arrangement, which inherently includes friction and noise that are both undesirable, especially in a situation where squeaks and rattles are being tested within a vehicle.

A combination of flexure assemblies 34 and flexure pivot assemblies such as 750 make it possible to provide an effective direct body excitation system for detecting squeaks and rattles within a vehicle. The flexure arm arrangement of this invention allows for inputting forces directly into any structure, such as the stiff sections of a vehicle body like the sill or into the frame of the vehicle, which avoids the needs to access the tire patch. This provides significant advantages because the shaker does not have to be directly underneath the vehicle body. Instead, the shaker can be positioned to the side of the vehicle body and a transition member designed according to this invention transmits the motion from the shaker to the vehicle body as described above. The combination of flexure arms 34 and flexure pivot assemblies permits inputting relatively smaller forces directly to the vehicle body for detecting squeaks and rattles.

A testing device designed according to this invention more effectively excites squeaks and rattles within a vehicle that are representative of what a vehicle customer eventually hears on the road. The noises that are audible and measurable are inside the vehicle interior and are not masked by test equipment noises when this invention is utilized. Moreover, direct body excitation is made possible using electrodynamic shakers fitted with multiple flexure assemblies designed according to this invention and a flexure pivot arrangement for permitting pivotal motion of a transition member.

Using this invention, it is possible to correlate subjective and objective measurements for squeak and rattle detection. Moreover, testing results are more repeatable and reliable. Further, the simulation of road conditions that typically cause squeaks and rattles are more readily reproducible. Electrodynamic exciters can easily excite vehicles in excess of 500 Hz, which is well above that possible using hydraulic road simulators. This invention provides improved vehicle refinement and permits technicians to identify more subtle noises that may become annoying to customers in the future at noise levels inside vehicle interiors that otherwise could not be detected and corrected.

A testing assembly designed according to this invention is not only superior in performance and capability, but is more economical to produce, install and utilize over time.

As can be appreciated from the preceding description, a flexure assembly designed according to this invention is useful for a variety of applications. Moreover, a flexure assembly designed according to this invention provides a frictionless, stable and noiseless support that allows a moving member to move while preventing any off-axis motion.

The preceding description just gives example embodiments of this invention. For example, more than one flexure arm or more than two flexure leaves may be useful for some situations. The scope of legal protection given for this invention is to be limited only by the following claims, which encompass all fair legal equivalents allowed by law.

We claim:

1. A noiseless flexure pivot assembly that permits motion about a pivot axis without making any audible noise, comprising:

a first pivot member that has a body which permits movement in one direction and resists movement in other directions;

a second pivot member that has a body which permits movement in one direction and resists movement in other directions, the second pivot member being positioned and oriented relative to the first pivot member such that one end of the second pivot member remains stationary relative to one end of the first pivot member and a second end of the second pivot member remains stationary relative to a second end of the first pivot member and the combined pivot members permit restricted motion along the pivot axis.

2. The device of claim 1, wherein the pivot members comprise generally flat sheets of metal.

3. The device of claim 1, wherein the pivot members are positioned at right angles relative to each other.

4. The device of claim 1, wherein the pivot members are arranged in a cross-like configuration.

5. The device of claim 1, wherein the first pivot member is generally within a first plane, the second pivot member is generally within a second plane that is perpendicular to the first plane and a third pivot member is within the second plane, the second pivot member being on one side of the first pivot member and the third pivot member being on an opposite side of the first pivot member.

6. The device of claim 5, wherein the pivot members each have a length, a width and a thickness and wherein the first pivot member has a width that is greater than the width of the second and third pivot members.

* * * * *